INVENTOR
NICHOLAS ANTON

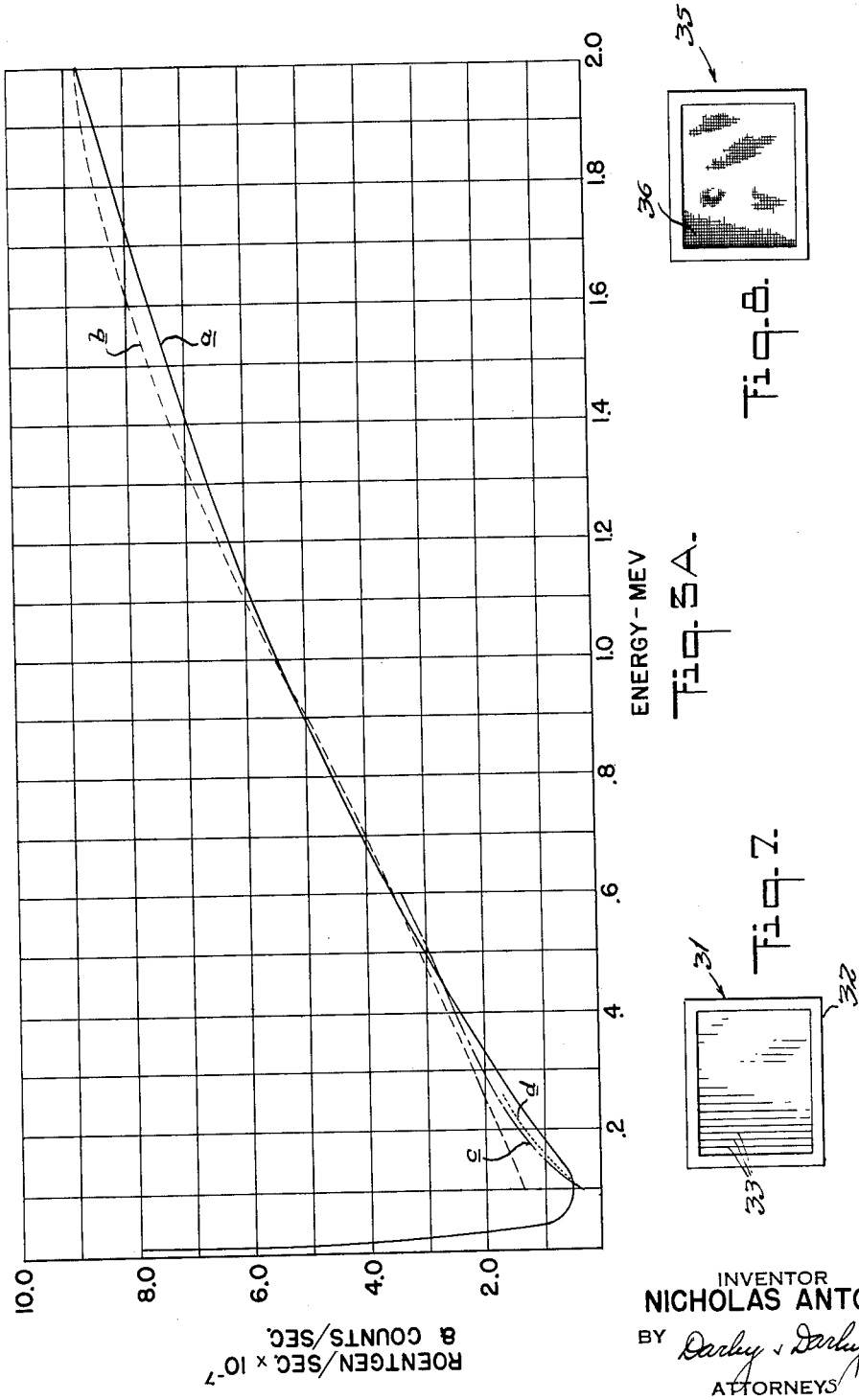

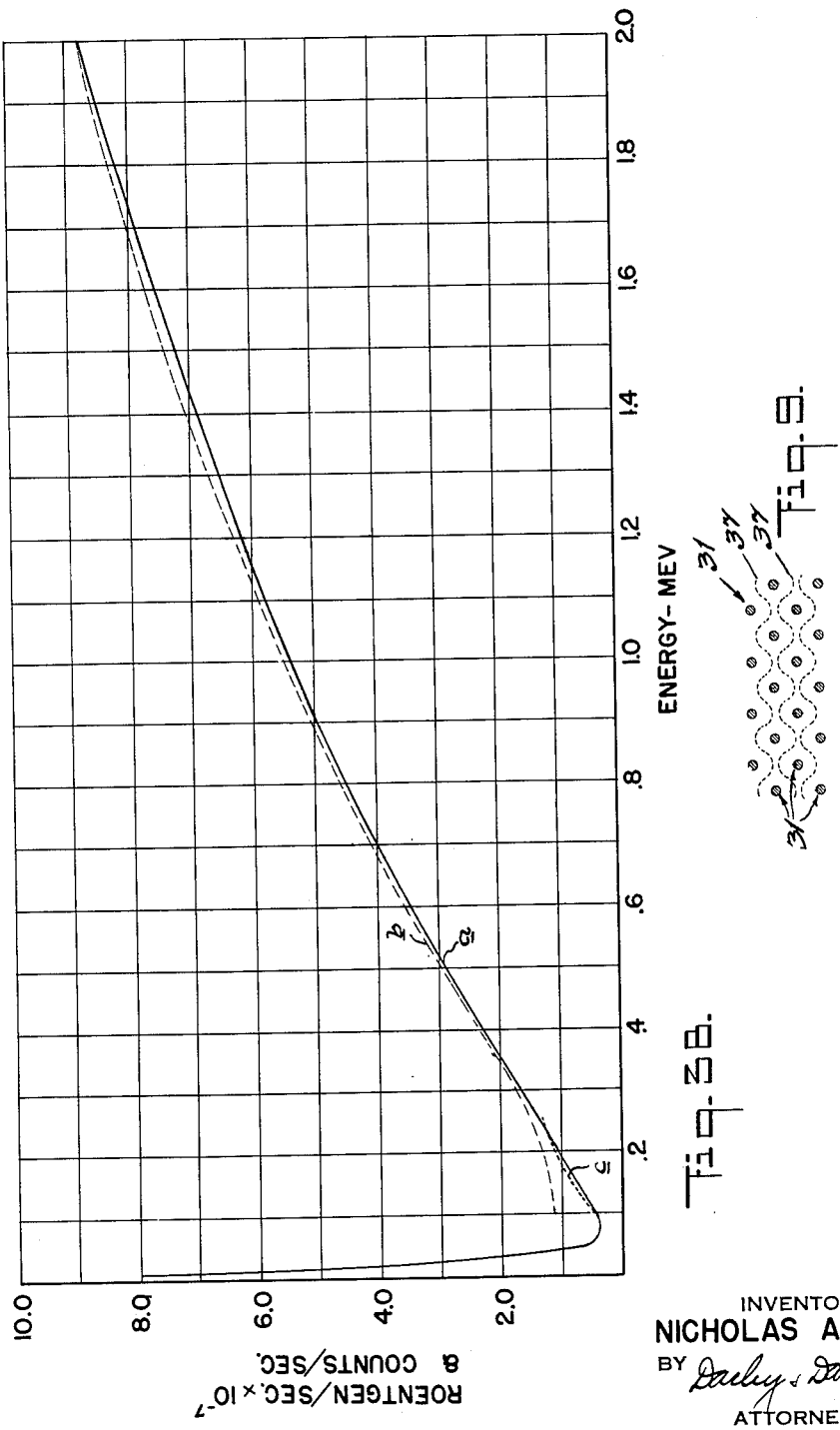

United States Patent Office 3,207,938
Patented Sept. 21, 1965

3,207,938
SUPERATMOSPHERIC PRESSURE IONIZATION
CHAMBER FOR DETECTION OF RADIANT
ENERGY
Nicholas Anton, 1226 Flushing Ave., Brooklyn 37, N.Y.
Original application July 24, 1953, Ser. No. 369,985, now
Patent No. 3,022,424, dated Feb. 20, 1962. Divided
and this application Oct. 31, 1961, Ser. No. 115,257
19 Claims. (Cl. 313—93)

The present application is a division of my copending application Serial No. 369,985, filed July 24, 1953, for Radiation Dosimeter, issued as Patent No. 3,022,424, on February 20, 1962, which is a continuation in part of my application Serial No. 96,711, filed June 2, 1949, for Radiation Dosimeter (now abandoned).

The present invention is directed to the art, including indicators for radiant energy such as X-rays and radiation from artificial or natural radioactive substances, and is particularly concerned with providing a detector and indicator operable over a wide band of radiation energy levels showing the effect of such radiation upon persons, animals, or other objects exposed thereto, such indicators being generally known as dosimeters.

Speaking generally, radiation can be divided into two large categories: Electromagnetic radiation and corpuscular radiation. Electromagnetic radiation comprises low, high and ultra high frequency radio waves, infrared rays, visible light, ultraviolet light, ultraviolet rays, Grenz rays, X-rays, gamma rays, and an approximately 20% component of cosmic rays; in other words, the entire frequency spectrum. Corpuscular radiation comprises thermal, secondary, photo and other low energy electrons, cathode rays, beta rays, alpha rays, thermal and high energy neutrons, deuterons, mesotrons, and an approximate 80% component of cosmic rays, and others.

Electromagnetic radiation, possessing no charge, can only be detected by its action on matter; namely, the generation of charged moving particles. These reactions occur in discrete quantities of energy called quanta or photons, the energy (E) of which is proportional to the frequency ($f$) of the radiation being absorbed or emitted. This relation is expressed by the formula $$E = hf$$

where $h$ is Planck's constant. All electromagnetic waves travel in air with a speed of $3 \times 10^8$ meters per second. The wave length ($\lambda$) and the frequency ($f$) of electromagnetic radiations are related to the speed of travel ($c$) by the relation $$\lambda = \frac{C}{f} \text{ or } c = \lambda f$$

From the above it will be noted that the higher the frequency of the radiation the shorter its wave length and the higher its energy. From this relation may be derived the equation $$\lambda = (1238/E) \times 10^{-13}$$

when $\lambda$ is given in Angstrom units and E in millions of electron volts.

The interaction of electromagnetic radiation with matter is independent of the method by which the radiation has been generated and is dependent only on its energy. The modes of interaction of radiation with matter are as follows:

(1) PHOTOELECTRIC EFFECT

In this effect the photon interacts with the whole atom. The common result is the emission of an atomic electron from any of the electron orbits, but especially from the K and L orbits. This electron then possesses the entire energy of the photon minus its original binding energy. The electrons are ejected usually in a direction at approximately 90° to the direction of the impinging gamma ray. The photoelectric absorption of a collimated monochromatic beam of gamma rays of energy $hv$ passing through a thickness $dx$ cm. of a material of atomic number Z and containing N atoms/cm.[3] is $Tdx$ where T is the absorption coefficient and equals $NZ^4f_1$/cm., where $f_1$ is a complicated function of the photon energy and Z; $f_1$ varies with $hv$ approximately as $(1/hv)^n$ where $n$ has a value of about 3 for .02 million electron volts (mev.) and about 1.6 for 2 mev.

(2) COMPTON EFFECT

The Compton effect is an elastic collision of a photon with a single atomic electron. The energy of the incoming gamma ray photon is then shared by the ejected electron and the degraded (lower energy and frequency) or scattered quantum $hv'$. The angle of scattering ($\psi$) can have any value from 0 to 180° and increases with decreasing energy of the original gamma ray.

The energy difference ($hv-hv'$) lost by the photons, impinging and scattered, appears as kinetic energy ($E_{comp}$) of the Compton recoil electron. $E_{comp}$ can therefore have any value from zero to a maximum. It depends on $hv$ and has its maximum when the Compton electron is ejected straight forward ($\psi=0$) in the direction of the incident photon and when the angle of scattering of the scattered photon is 180°.

Mathematically:

$$(E_{comp}) \max. = hv/1(1 + m_0c^2/2hv)$$

where $m_0$ is the rest mass of an electron and $m_0c^2$ is the rest electron energy = .51 mev.

The maximum energy of the Compton electrons is, therefore, a measure of the energy of the impinging gamma beam.

The total Compton absorption for a calculated monochromatic beam of gamma rays of energy $hv$ passing through a thickness $dx$ cm. of a material of atomic number Z and containing N atoms/cm.[3] is $\sigma dx$ where the absorption co-efficient $\sigma = NZf_2$/cm. The electronic cross-section $f_2$(cm.[2]/electron) is dependent only on the energy $hv$.

(3) PAIR FORMATION

If the energy of the gamma ray is sufficiently high it may be completely absorbed near the boundary of an atomic nucleus. Two electrons, one positive and one negative are the resultant effect. Because their rest masses are $m_0$ the impinging gamma ray has to have a minimum energy of $2m_0c^2 = 1.02$ mev. The excess energy is shared mostly by the electrons because of the relatively large mass of the nucleus. We see then that the electron may have any kinetic energy between zero and ($hv-1.02$) mev. because of the complete absorption of the impinging photon $hv$.

The total pair production absorption for a collimated monochromatic beam of gamma rays of energy $hv$ passing through a thickness $dx$ cm. of a material of atomic number Z and containing N atoms/cm.[3] is given by $Kdx$ where the absorption coefficient $K = NZ^2f_3$/cm., where $f_3$ depends only on $hv$. It is zero for values of $hv$ lower than 1.02 mev. and increases approximately linearly with energies above 1.02 mev.

The life of the positron is very short because it generally collides with an atomic electron within a few millimeters (in a solid) of its origin, giving rise to annihilation radiation of .51 mev.

*Total coefficient of gamma absorption*

The total linear coefficient of absorption ($\mu$) for a collimated monochromatic beam of gamma rays of energy $hv$ passing through a thickness $dx$ cm. of a material will be given by the sum of the individual absorption coefficients mentioned above.

The decrease $-dI$ of the impinging intensity $I$ is given by:

$$-dI = (\tau + \sigma + K)I dx = \mu_1 I dx$$

Rearranging and integrating we find that the ratio of emergent intensity $I$ to incident intensity $I_0$ is:

$$I/I_0 = \epsilon^{-\mu_1 x}$$

The linear coefficient of absorption $\mu_1$ is specific for the material for which it was determined and as such is dependent on the physical state of the absorber. It is known, though, that the absorption is proportional to the mass of the absorber. Therefore, we have the relation $1 = \mu_m \rho$ where $\rho$ is the area density of the absorber (gm./cm.$^2$) and $\mu_m$ is the mass coefficient of absorption. $\mu_m$ is independent of the physical nature of the absorber. The expression $$I/I_0 = e^{-\mu_1 x}$$

assumes that all the energy lost by the impinging beam of radiation has been absorbed. We know this is not usually the case; at least one considerable part is scattered just as light is reflected by some surfaces. It is very difficult and sometimes impossible to account for every fraction of the apparently absorbed beam and hence the linear coefficients of absorption given in the literature are the observed total reduction in intensity measured for relatively thin absorbers and for radiation as monochromatic as is possible to obtain. The absorption coefficient does not vary with temperature but, as we have seen, varies with the energy of the radiation. The value of the coefficient of the absorption will, therefore, reflect the changes in the mode of interaction with frequency. At long wave lengths the absorption coefficient has some abrupt discontinuities. These discontinuities occur at critical wave lengths for each element and correspond to the energy level necessary to displace K, L, M, N, etc., electrons from their respective orbits. These absorption discontinuities for most metals occur at energy values lower than .1 mev.

One of the many applications of the absorption properties of materials has been the measurement of the intensity of radiation. For standardization purposes, especially in the medical field, a unit of energy absorption has been adopted and defined. The "roentgen" is that quantity of gamma or X-radiation which will cause such ionization in 1 cc. of standard air as to allow the passage of one electrostatic unit of electric charge, i.e., the production of $2.083 \times 10^9$ ion pairs in the given volume of air. The roentgen ("r.") does not depend on time and, consequently, dosage rates are given in "r." per unit time.

Presently available biological evidence indicates that damage by radiation in tissue is not only caused by the total amount of ionization but by the density of the ionization as well. This specific ionization varies greatly with the type and energy of different kinds of radiation. Thus a different amount of damage has to be expected from 1 mev. photon than from 1 mev. beta ray or from 1 mev. alpha ray. If the energy lost in the tissue by the impinging radiation is the same as that lost by one roentgen of X-rays, the dose is defined as one Roentgen equivalent physical (rep.). The effectiveness of radiation will vary also between different tissues or organisms. As mentioned above, the same total amount of energy loss can produce different damage depending on the type and energy of the incident radiation. For this reason, the Roentgen equivalent man (rem.) unit has been defined as that amount of energy absorbed in tissue which is biologically equivalent to 1 roentgen's effect in man. Various relations between r., rep., and rem. have been suggested, but not generally accepted, for neutron, alpha, beta, X- and gamma radiation. For the purpose of our presentation we will assume only that some relation exists.

For the reasons stated above and others, it will be understood that it is not sufficient merely to count the number of incident particles or photons; we must know, too, the energy spectrum of the radiation and its specific density. This has been realized and the health physicist has used various instruments, such as proportional counters, Geiger counters, photomultipliers, crystal counters, etc. only for qualitative or relative measurements, unless the energy and quality of the radiation field is known or can be determined by absorption, spectroscopic or other methods. Only one type of instrument gives an indication of total ionization and that is the ionization chamber. This instrument is limited to narrow energy bands of radiation due to wall effects and becomes extremely large for accurate determination of high energy fields. Air is generally used as the absorber in the ionization chamber because it has an atomic number almost equivalent to that of muscular tissue.

Fatty tissue absorbs less energy than muscular tissue at energies lower than .2 mev., while bone tissue absorbs as much as 900% the amount of energy of muscular tissue at energies lower than .3 mev. It is clear from this that the use of air as an absorber in ionization chambers does not eliminate the energy dependence of the instrument even for limited use in the medical field.

The roentgenologist, and the health physicist to some extent, have been accustomed to measure the dosage of radiation in roentgens. It is, therefore, desirable to have dosimeters read directly in roentgens per unit time, and over a wide range of radiation energy levels, without having different readings for the same dosages at different energy levels. The present invention provides a method of achieving from combinations of absorbers and shields a response to the impinging radiation which is roentgen proportional (i.e., directly proportional to the roentgen dosage). Alternatively, any other desired type of proportionality or law of variation can be attained.

It is accordingly an object of the present invention to provide a direct reading dosimeter reading directly in roentgens per unit time and usable with high accuracy over a wide range of energy level. In one form an indicator is provided useful over the range from .1 mev. to 2 mev. and with relatively high roentgen sensitivity such as of the order of .02 milliroentgen (mr.) per minute per division for the most sensitive scale up to a total scale reading of 500 to 1000 r. per hour. This is done according to the present invention by the use of a detector utilizing a special arrangement of wall for confining a gas in the indicator space, in accordance with the principles hereinafter described.

In addition, according to the present invention, an improved dosimeter is provided which responds to both gamma and beta radiation in any proportions, to give a direct reading of the total effect of such radiation upon human tissue.

According to another feature of the present invention, a direct-reading roentgen indicator is provided using a combination of proportional Geiger tube and ionization chamber principles to give accurate dosage indications over wide ranges of energy level of gamma or beta radiation or any mixtures of both. Such an indicator is made readily adaptable for portable use, by requiring only moderate operating voltages of the order of 100 to 1000 volts and by being capable of using relatively rugged direct indicators such as microammeters.

Other objects, advantages and features of the present invention will become more readily apparent from the following detailed description taken in conjunction with the appended drawings, in which:

FIGURES 3A and 3B are further explanatory graphs;

FIGURE 7 is an elevation view of one of the electrode arrangements of FIGURE 6;

FIGURE 8 is a similar view of another of the electrode arrangements of FIGURE 6; and FIGURE 9 is a fragmentary enlarged cross-sectional view of a modification of FIGURE 6.

Figure 1:
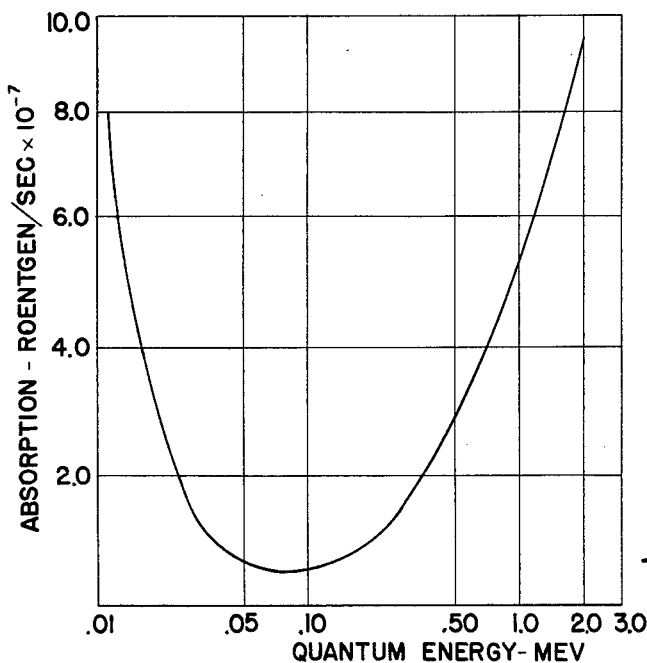
FIGURE 1 is a graph useful in explaining the principles of the present invention.

For a better understanding of the nature of the invention, reference is made to FIGURE 1, which is a curve showing the energy absorption per cubic centimeter of air at standard temperature and pressure plotted against the logarithm of the energy level or quantum energy per 1000 gamma ray photons. It will be understood that the rate of energy absorption per cubic centimeter of air is substantially proportional to the dosage for human muscle tissue exposed to the indicated quantum energy, measured in roentgens per unit time.

It will be seen from the left downward sloping portion of this curve that for low quantum-energy levels of radiation the absorption is high, indicating a high damage to human tissues by such radiation. This is due principally to the photoelectric effect discussed above. As the energy level increases, the effect on human tissue decreases to a minimum at approximately .08 mev. The increasing ionization effect shown at the right hand upward sloping portion of the curve above .08 mev. is caused mainly by the Compton effect already discussed, up to about 1 mev., above which the pair formation effect becomes the important factor.

In order to provide a wide range direct reading roentgen meter or dosimeter, it is therefore necessary that the response of the instrument approximate the shape of this curve. That is, since the harmful effect of radiation below .08 mev. decreases with increasing energy level, the indicator response must similarly decrease. Likewise, for increasing energy level above .08 mev., the indicator response must increase in correspondence with the form of the curve of FIGURE 1. Thus, the indicator must be provided with radiation energy discriminating means. It will be understood also that the indication must be directly proportional to the intensity of the radiation, which may be measured by the total number of radiation photons impinging upon the indicator per unit time. I have discovered that such a correspondence can be provided by a proper choice of materials and dimensions for the wall of a detector, as explained below.

Figure 2:
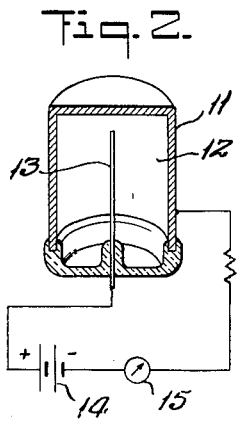
FIGURE 2 is a schematic diagram of a Geiger counter tube and its circuit.

FIGURE 2 shows in general schematic form the arrangement of elements for a self-quenching Geiger counter tube.

Such a tube is formed by a chamber 11 having a hollow interior 12 containing an ionizable medium which may be air, argon, helium, chlorine, alcohol, methyl iodide, or other suitable gas and/or vapor, alone or in combination, under suitable pressure, such as below atmospheric or higher. Chamber 11 is illustrated as cylindrical in shape, but may be of spherical, ellipsoidal, cubical rectangular or other shape as desired. Extending preferably axially within chamber 11 is a very fine anode wire or rod 13. Chamber 11 forms the cathode of the tube and is connected to the negative terminal of a battery 14 or equivalent source of unidirectional voltage, whose positive terminal is connected to the anode 13. A suitable indicator 15 of electron current (such as, for example, an oscillograph) is connected in the series circuit between anode 13 and cathode 11.

In operation, some of the gamma ray photons impinging upon the chamber 11 will interact with the wall of the chamber, becoming absorbed thereby and creating one or more high velocity electrons per photon, either by the photoelectric effect or the Compton effect or by pair formation, depending upon the energy level of the impinging radiation.

The high energy electrons (beta rays) thus produced by the absorption of radiation by the wall matter create ionization of the contained gas within the chamber 11. Roughly, in standard air, for each 32.5 ev. of the electron energy one ion pair will be produced. Thus a large number of secondary electrons may be produced. These secondary electrons are attracted to the positively charged anode 13. However, in view of the highly concentrated electric field in the vicinity of the anode 13, these electrons are further accelerated and produce still more secondary electrons. This effect is continued until the electrons are finally collected by the anode and produce a burst of electron current in its circuit, known as a "count." The effect just described provides an electron multiplication or amplification, which may give a gain of $10^4$ to $10^6$, rendering it possible to indicate the count on known sensitive current meters, such as meter 15. (In practice, it will be understood that many Geiger tubes are used in parallel, or further amplification is used, to provide sufficiently large indications adapted for registering upon less sensitive indicators, such as microammeters, cathode ray oscilloscopes, or the like.)

Thus, each high energy electron forms a burst of secondary electrons, which produce a single count. The Geiger tube essentially counts the number of such high energy electrons, and yields thereby an indication of the relative intensity of the impinging radiation at a given energy level, but can give no indication of the energy level of such radiation.

It will be understood that the number of high energy electrons directly produced by the gamma radiation depends upon the nature and thickness of the absorbing material forming the wall of the chamber 11 (due to the relatively minor density of the gas within the chamber, absorption of high energy gamma radiation by the gas is relatively insignificant). This affords a way, according to the present invention, of obtaining the energy-discrimination effect discussed above as desirable for producing a direct-reading dosimeter.

Such energy-discrimination is produced according to the present invention by providing a radiation absorber or converter for the gamma radiation which produces a number of output photoelectrons (or beta ray quanta) such that, for each energy level of impinging radiation, the tube indication is in proportion to the ordinates of the curve of FIGURE 1. I have discovered that this can be done practically and for a wide range of radiation energy levels, by proper choice of material and size of the wall of the chamber 11. The necessary condition is to provide a tube response vs. radiation energy curve approximating that of the curve of FIGURE 1. Such a response curve can be obtained in various ways.

First, the coefficients of absorption for both gamma and beta rays, for many different materials, are determined. It will be understood that the beta coefficient of absorption has to be considered, too, since it shows the absorption of the secondary beta rays while they traverse the distance in the absorber between the point of generation and the escape surface. It should be borne in mind that not only do the gamma and beta coefficients of absorption vary between materials, but that their ratios vary also. These variations of values of beta and gamma coefficients of absorption result in an optimum thickness of absorber for maximum beta ray yield for a specific energy of impinging X or gamma radiation. The variation in the value of the ratios of beta and gamma coefficients of absorption between different materials is reflected in the different shapes of curves obtained by plotting beta ray yield against the energy of the incident gamma rays.

After obtaining various response curves for a great many metallic and non-metallic elements, alloys, compositions, and mixtures, because of the differences in response obtained from different absorbers of different thicknesses, may be combined to give any desired shape to the response curve, and particularly the desirable direct-reading energy-independent relationship.

The general principles of the invention will be clearer from the following discussions of a simplified case.

In an ideal air-filled ionization chamber, having no wall or boundary effects, where complete electron equilibrium exists, the ionization per gram of air is the same as the gamma ray energy loss per gram of air. Such an ideal chamber would produce the directly proportional curve shown in FIGURE 1, with a constant of proportionality determined by scaling factors; i.e., whether the reading is given in terms of roentgens per hour, milliroentgens per second, etc.

If N is the number of gamma photons per square centimeter per second of energy E (in mev.) and $\sigma_a$ is the Compton absorption of air (assuming only the Compton effect to be significant, if not, then the photoelectric and/or pair-formation absorption coefficients must be added), then the energy absorbed per cubic centimeter and hence the ionization produced can be shown to be (1) $\qquad 0.0532 N E \sigma_a V_r / \text{hr.}$ where V is the volume of the chamber.

The number of counts produced in a counter tube is dependent not only upon the number of incident photons, but more primarily upon the number of secondary electrons (beta ray quanta) produced within the tube by interaction between the incident photons and the wall of the tube. However, some of the produced secondary electrons will be themselves absorbed within the wall, and will fail to produce counts.

For simplified conditions, such as that secondary electrons proceed in the same direction as the incident photons, and that each produces a count, the number of counts per second C is given by (2) $\qquad C = NA \dfrac{\mu_\gamma}{\mu_\beta - \mu_\gamma} (\epsilon^{-\mu_\gamma x} - \epsilon^{-\mu_\beta x})$ where A is the counter tube cathode wall area, $\mu_\gamma$ is the linear coefficient of absorption for gamma rays of energy $\epsilon$ (in mev.), $\mu_\beta$ is the similar coefficient for beta rays of energy corresponding to E, and X is the wall thickness.

By equating these expressions (1) and (2), an identity (3) $\qquad .0532 N E \sigma_a V = AN \dfrac{\mu_\gamma}{\mu_\beta - \mu_\gamma} (\epsilon^{-\mu_\gamma x} - \epsilon^{-\mu_\beta x})$ which simplified gives (4) $\qquad E \sigma_a = K \dfrac{\mu_\gamma}{\mu_\beta - \mu_\gamma} (\epsilon^{-\mu_\gamma x} - \epsilon^{-\mu_\beta x})$ is derived, where K is a constant of proportionality depending upon detection, dimensions and other factors, from which, by qualitative considerations, a suitable wall formed of one or more materials can be derived to provide the direct-reading feature of the present invention.

A, X and V are dependent solely upon geometrical considerations, that is, tube size and shape. $\sigma_a$ is a function of the absorptive medium, usually air. E is predetermined by the energy range over which the equality is to obtain. $\mu_\gamma$ and $\mu_\beta$ depend upon the wall material, being known for the common substances, and being the primary factors with X, to be determined to satisfy the identity.

While the above identity gives an approximation of the desired design for energy-independence, as a practical procedure it is often more desirable to use an empirical approach. The desired energy response of the tube is usually known, as in the form of the curve of FIGURE 1.

From the known chemical and physico-chemical requirements, a group of preferred materials can be selected. For example, the materials should be inert with respect to the gas or vapor in the tube, offer useful vacuum-sealing properties, be subject to simple fabrication and assembly processes, etc. From an equation such as (3) above, or from plots of the response characteristics of the materials, a suitable thickness of a suitable material for a tube whose dimensions are predetermined (usually to correlate with the choice of material), can be derived, which will give at least an approximation of the desired energy-independence. Then a second or further materials can be added to modify the characteristic first obtained to be closer to the desired characteristic.

FIGURE 3A shows curves illustrating the manner in which the present invention is produced. Curve a is the same as that of FIGURE 1 (redrawn on linear coordinates). Curve b shows a response obtained by the use of an iron-walled chamber 11 of 11.5 mils (.0115 inch) thickness, this thickness having been selected in accordance with the considerations discussed above. As will be seen, this iron chamber produces a close correspondence (within 5%) of the desired curve for a range of .45 mev. to over 2.00 mev.

This energy range can be further extended by associating with the wall of the material and thickness just indicated, a further thickness of a different material. As will be seen in FIGURE 3A, at the lower energy levels, iron alone produces too many counts per second. Hence an additional material is added to absorb some of the secondary electrons produced by lower energy level radiation, while not impairing the production of secondaries appreciably at higher levels. Such materials are the heavier elements, such as platinum, chromium or tantalum. For example, the addition of 3.6 mils of platinum will produce the curve shown at c in FIGURE 3A, which extends the lower end of the useful energy range to about .40 mev. Similarly, adding 5.3 mils thickness of tantalum produces the curve d of FIGURE 3A, which is within 3% of curve a from about .35 to over 2 mev., and within 5% of curve a from about .30 mev. up. Still another example may utilize .008–.014 inch chromiron (72% iron, 28% chromium) with .012–.016 inch tantalum, or .040–.055 inch chromiron with .006–.010 inch tantalum. Very slight adjustments in these cases can be made by associating a light material with the tube, such as a polystyrene enclosure or block, of 3/32 to 5/32 inch thick. When chromiron is used, chromium and iron may be used separately in the same proportions of 28% and 72%.

Thus, this absorber 11, when exposed to gamma radiation of different energies, gives a response curve which is proportional to the response of the ideal ionization chamber (in other words, it is roentgen proportional), over the ranges stated.

The present invention is not in any way restricted to the specific materials just mentioned. Thus, with a wall of aluminum of 41 mils thickness the number of counts per second produced is as shown in the curve b of FIGURE 3B, which is also plotted together with the curve of FIGURE 1 at a. It will be seen that, for energy levels from approximately .3 mev. upward to above 2 mev., the number of counts per second derived from such an indicator varies with radiation energy level in substantially the same way as the number of roentgens per second of the desired characteristic at a, which closely represents the effect of radiation on the human tissue.

The range of usefulness for this direct-reading roentgen meter can be further extended down to .1 mev. by the addition of 2.7 mils of platinum, as shown by the curve c of FIGURE 3B.

It will be understood that many other materials or combinations of materials can also be used, and the energy range further extended. As has been shown above, combinations of a number of absorbers of correct thicknesses can give almost any desired shape of the response curve when radiation of different energies is incident, affording the possibility of creating either or both an energy-discriminating and a radiation-discriminating system. It is also possible to obtain non-linear responses where portions of the curve are deliberately exaggerated by known factors to approximate energy absorption in different media.

Furthermore, the detector wall material can be made to correspond to any desired dosage characteristic. Thus, the effect of radiation upon human bone tissue is different from that on muscle tissue. Therefore, to provide a direct-reading dosimeter for bone tissue, a different material or thickness or different combination of materials of proper thickness would be used, to match the absorption vs. energy level characteristic of the detector wall, to the injury vs. energy level characteristic of the substance whose dosage is to be indicated, whether it be human or animal muscle tissue, bone or fatty tissue, or gems to be irradiated for color change, or sterility or cancer effects, on animals or humans, etc.

To facilitate the production of these absorbing wall combinations, various manufacturing processes may be used, such as, (1) stacking of sheets of different materials and thicknesses, (2) plating of one material upon another, (3) electroforming, (4) evaporation of one material on another, in vacuum, (5) pressing and sintering mixtures of metallic powders, (6) pressing polymerized resins containing mixtures of metallic powders, (7) casting alloys of the proper materials, (8) casting filled resins, etc., in each use with the suitable effective thicknesses.

It should be understood that the theoretical analysis presented hereinabove contemplates the use of an absorbing wall of homogeneous construction and if a non-homogeneous construction is utilized slight adjustments might be required in the relationships expressed hereinabove, in equation 3 for example.

It should be noted that all the beta rays (secondary electrons) produced by the absorber should preferably be collected by the anode. This can be accomplished in many ways depending on the intensity of the incident radiation. Geiger tubes with walls made from an energy-discriminating material, as just described, can be used, as well as similarly constructed ionization chambers. Amplification of the secondary electrons can also be obtained by the use of secondary eletron multipliers, photomultipliers, and other devices.

The devices mentioned above detect electrons (beta rays) and record them either as counts, as in proportional counters, Geiger counters, and possibly crystal counters and scintillation counters, or absorb, partially or entirely, their energy and record it as a current as in the ionization chambers. In any of these cases, the present invention contributes substantially in making the detector energy-discriminating to achieve "r." (or any other desired) proportionality because, as has been seen, the number of secondary electrons produced is proportional to the desired criterion, thus satisfying the necessary conditions for "counting" detectors, and, in the second case, it eliminates the primary "variable" of wall effect from the total reading.

The beta particles emitted by a given radioactive substance or those produced by the absorption of gamma rays do not all have the same velocity. Instead, it is found that the majority of the energy in the beta ray is carried by beta particles whose velocities range in a continuum from zero to a definite maximum. The maximum energy of these spontaneously ejected electrons is a characteristic of the emitter, and is usually between 3 and 4 times the average energy. As a rule, the maximum energy holds the major interest, and most of the empirical absorption formulae are in terms of this maximum $E_m$.

It has been found that for radioactive beta ray spectra, the absorption curve obtained in ionization measurements is often nearly exponential over the majority of its length, and can be represented approximately by:

$$I/I_0 = E^{-\mu_\beta x}$$

where $I/I_0$ is the fraction of the initial ionization, measured after the rays have passed through X cm. of absorber; $\mu_\beta$ is the apparent linear absorption coefficient for the particular spectrum expressed in cm.$^{-1}$.

The fact that these beta rays obey an absorption law similar to that for gamma rays is entirely fortuitous in view of the complicated processes of their interaction with matter. By experiment it has further been shown that $\mu_{\beta/\rho}$ (mass absorption coefficient) is nearly independent of the atomic weight of the absorber—rising slightly with increasing atomic number. Beta ray absorptions are, therefore, given in mg./cm.$^2$ and generally no mention is made of the nature of the material of the absorber.

The problem of converting the beta ray energy into slow electrons for collection in an ionization chamber is one of making the size of the chamber such that the entire energy of the beta ray electron will be spent therein before it hits a wall, i.e., making the size of the chamber greater than the range of travel of the beta ray electron in the medium inside the chamber, and designing an electrical collecting system such that it will reduce secondary electron recombinations to a minimum and assure maximum electron collection without amplification (secondary ionization). To avoid making the chamber unduly large, ionization chambers for high energy beta ray electron counting are usually pressurized. The collecting voltages assume correspondingly greater values and values such as 20,000 volts are not uncommon. Various methods have been used to reduce or eliminate wall effects. Examples can be found in the thimble chambers, in air wall chambers, and the like. The only really foolproof method is that used in the standard ionization chambers where the walls are formed by the action of fields in much larger containers.

Figures 4, 5:
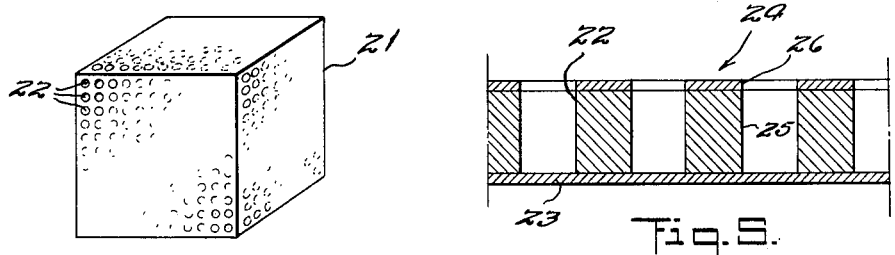
FIGURE 4 is a perspective view of an indicator utilizing the principles of the present invention.
FIGURE 5 is a fragmentary enlarged cross-sectional view of the wall of the device of FIGURE 4.

Utilizing one of the features of this invention—"r." proportional absorbers—an ionization chamber has been constructed embodying the principles expounded above as well as further new and novel features. FIGURE 4 shows one of the forms this improved ionization chamber takes when measuring X and gamma radiation of energies in excess of a few thousand electron volts up to 2.5 mev., and/or beta radiation of energies from .07 to 2 mev.

As shown in FIGURE 4, the chamber 21 is a hollow cube, at least 15 cm. in length per side. The walls 23 are "r." proportional (i.e., constructed as described above) and half of the wall surface is formed by 1/32" perforations 22. As shown in FIGURE 5, the walls 24 may be formed of successive layers 25, 26 of different materials, as described above, to obtain "r." proportionality. A .7 mil duralumin sheet 23 lines the inside of the walls of the chamber. This sheet 23 may, for example, be caused to fuse to the walls 24 by the use of extremely high pressures at temperatures considerably below the melting point of the layers 25, 26.

The air pressure within the chamber 21 is raised to a pressure of approximately 50 atmospheres. This assures the complete absorption of the energy of the incoming primary and the generated secondary beta rays in the space within the chamber. The formation of one ion pair in air requires the expenditure of approximately 32 ev. The beta ray in expending its energy in the chamber creates a number of pairs equal to its energy divided by 32. The air in the chamber contributes approximately 4 times the number of secondary electrons generated by the walls since it absorbs 4 times the amount of energy from the impinging gamma ray beam; this number of secondary electrons is "r." proportioned since the electrons are created by an "r." proportional wall. Small traces of helium, argon, krypton, xenon, and/or other gases may be introduced if needed to lower the operating voltage and to correct for inaccuracy in the "r." proportional energy-discrimination. The principles involved are exactly the same as those expounded above for the double-layer "r." proportional absorber, since, as mentioned before, the gamma coefficients of mass absorption are independent of the physical state of the absorber.

The electrode structure could be a conventional anode. The voltage in this case would have to be quite high to assure electron collection before recombination, since the ion recombination rate is proportional to the second power of the gas density. The currents involved would be those common to ionization chambers, i.e., $10^{-12}$ to $10^{-15}$ ampere. The insulation inside and outside the chamber poses a considerable problem, and high gain and very sensitive amplifiers have to be used. Anyone familiar with these instruments is fully conscious of the many variables and difficulties experienced in practice with high resistance, low current techniques.

Figure 6:
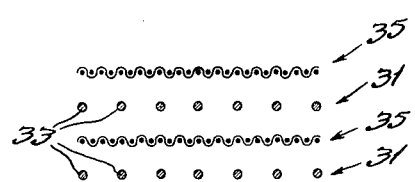
FIGURE 6 is a fragmentary enlarged cross-sectional view of an improved electrode structure useful in the device of FIGURE 4.

A novel collecting system is therefore provided for the present chamber, as shown in FIGURES 6 to 8.

The positive electrode consists of a plurality of sets of wire frames 31, one of which is shown in FIGURE 7. Each frame consists of an outside heavy support 32 holding .001" tungsten wires 33 spaced 5 mm. apart under slight tension. These positive frames 31 are spaced approximately 1 cm. apart and are supported by suitable insulation attached to the walls of the ionization chambers. The negative electrodes 35 are grounded to the chamber walls 24 and are interspaced between the positive frames 31. A simple form of the negative frame 35 is shown in FIGURE 8 and comprises a metal screen 36 .0002" thick having a transmission factor of approximately 70%. According to one modification, the negative frames 35 may be formed in the same manner as the positive frames 31, as shown in FIGURE 7, except that the wires for the negative frames are finer and spaced closer together to present an electrostatic plane.

According to a further embodiment, shown in FIGURE 9, to assure uniformity of gradient, the screen 36 is corrugated as at 37 so that two opposing corrugations are part of a circle about 1 cm. in diameter. At the center of this circle is located the positive collecting electrode wire 33. These negative corrugated screens 36 are staggered as are the positive electrodes 31, in successive layers.

With the electrode design and pressures mentioned above, it is possible to obtain electrostatic field gradients sufficiently high at the anodes (positive electrode wires 33) to assure proportional electron avalanche amplifications of the order of $10^2$ to $10^4$, with the application of potentials of the order of 1275 volts. Higher amplifications are easily attained by increasing the applied potentials.

The above mentioned construction of the ionization chamber 21 allows it to be pressurized and still permits the admission of low energy beta rays through the apertures 22. The wall effect is "r." proportional. The collecting system is capable of amplification as required by the intensity of the impinging beam and the sensitivity of the indicating or recording mechanism. In one particular instance, where one of these chambers 21 is used as a dosimeter, current responses of 1 microampere can be obtained when the ionization chamber is exposed to 1 mr./hr. field. This extremely high efficiency is due to the high absorption and amplification features described above, and should be compared with the millionths of microamperes and less obtainable with commercial ionization chambers. The high outputs of the present invention make it possible to indicate or record the readings directly without the use of electronic instrumentation.

This system therefore responds either to gamma radiation or beta radiation or any combination thereof, and the resultant indication is a direct measure in roentgens per unit time of the radiation exposure for human tissue. That is, no matter what intensity or amount or energy level of gamma radiation or beta radiation or both is encountered, if two identical readings are obtained it is then known that identical amounts of dosage for human tissue has been experienced, without regard to whether the radiation is beta or gamma or both, without regard to the energy level of the radiation, and without regard to the intensity of the radiation (that is, the number of gamma ray photons per second or the beta ray electrons per second).

Utilizing the above inventions it is possible to make up chambers capable of measuring all radiations, either individually or any mixtures thereof, of all ranges of intensities.

It is to be understood that the above description is illustrative only, and is not to be taken in a limiting sense, the present invention being defined solely by the appended claims.

What is claimed is:

1. A radiant energy detector responsive to both gamma radiation and to beta radiation, comprising a casing containing a volume of ionizable gas under super-atmospheric pressure and having a wall forming a cathode electrode, and an anode electrode within said casing, said wall being formed of a material responsive to gamma radiation to produce high energy electrons and being multiply apertured to permit passage of beta radiation, and a metal foil lining readily permeable to said beta radiation and extending over said apertured wall at the interior thereof.

2. A radiation detector as in claim 1, wherein said casing wall is formed of a material having an absorption of gamma radiation varying with energy level of said radiation and substantially in proportion to the ionization of air at each energy level for a wide band of energy levels above substantially .05 million electron volts.

3. A radiation detector for beta rays below a predetermined energy level comprising a chamber having a casing permeable to beta rays and containing a gas under superatmospheric pressure, the minimum dimension of said chamber being at least as long as the free path length in said gas of beta rays of said energy level.

4. An ionization chamber type of radiation detector comprising a gas-enclosing chamber having a radiation-absorbing wall and positive and negative electrode arrangements therein readily pervious to radiation to be detected, said positive and negative electrode portions being in close proximity to provide proportional electron amplification at relatively low voltages said gas being at superatmospheric pressure.

5. A radiation detector comprising a radiation-absorbing casing containing gas at superatmospheric pressure and an electrode structure within said casing, said electrode structure comprising a series of parallel anode wires and a cathode arrangement readily pervious to radiation to be detected spaced closer to said wires than the distance between said anode wires.

6. An electrode arrangement for radiation detectors comprising a plurality of sets of anode wires, each set being uniformly spaced in a single plane and the successive sets being arranged in parallel planes, and a plurality of cathode electrode arrangements, each mounted in a plane intermediate two adjacent plane sets of anode wires and readily pervious to radiation to be detected.

7. An electrode arrangement as in claim 6, wherein said cathode arrangement comprises a plurality of parallel wires greater in number than and more closely spaced than said anode wires.

8. An electrode arrangement as in claim 6, wherein said cathode arrangement comprises a mesh screen of conductive wires having a transmission factor of at least 70% and a mesh smaller than the separation between said anode wires.

9. A radiation detector comprising a radiation-pervious casing and an electrode arrangement therewithin, said arrangement comprising a series of parallel plane arrangements of uniformly spaced parallel anode wires, each consecutive pair of anode wire planes being separated by a cathode electrode arrangement readily pervious to the radiation being detected.

10. A detector as in claim 9, wherein each said cathode arrangement comprises a grid of parallel wires spaced more closely than said anode wires.

11. A detector as in claim 10, wherein said cathode electrode arrangement wires are arranged in corrugated fashion with a plurality of said latter wires being arranged arcuately about each of said anode wires.

12. A detector as in claim 9, wherein each said cathode electrode arrangement comprises a mesh screen of conductive wires having a transmission factor of at least 70% and with said latter wires spaced more closely than the separation between said anode wires.

13. A detector as in claim 12, wherein said screen is corrugated to have substantially arcuate sections concentric respectively with said anode wires on each side thereof.

14. A radiation detector responsive to both gamma and beta radiation comprising a casing having a wall adapted to efficiently absorb gamma radiation to be detected and convert said radiation into electrons, said wall being perforated over its entire area to provide apertures pervious to beta radiation, a radiation-pervious lining at the inner surface of said casing, said casing containing a gas under super-atmospheric pressure adapted to be ionized by both said electrons and said beta radiation and an electrode arrangement within said casing.

15. A detector as in claim 14, wherein said electrode arrangement comprises a series of parallel uniformly spaced anode wires and a cathode electrode adjacent said anode wires.

16. A detector as in claim 15, wherein said anode wires are arranged in sets, each set being coplanar and the planes of successive sets being parallel, said cathode electrode arrangement comprising a plurality of sections, each section being interposed between two adjoining planes of anode wires.

17. A detector as in claim 16, wherein each said cathode arrangement section comprises conductive wires spaced more closely than said anode wires and with a plurality of said cathode wires in the vicinity of each of said anode wires.

18. A detector as in claim 17, wherein said cathode wires are arranged in corrugated fashion with arcuate portions respectively concentric with said anode wires.

19. A detector as in claim 18, wherein said cathode arrangement is formed of a mesh screen having a transmission factor of at least 70% and with the wires thereof more closely spaced than the spacing between said anode wires.

References Cited by the Examiner

UNITED STATES PATENTS

| 2,465,821 | 3/49 | Smoluchowski | 313—93 |
| 2,475,603 | 7/49 | Friedman | 313—93 |
| 2,536,991 | 1/51 | Wollan | 313—93 X |
| 2,666,865 | 1/54 | Borkowski | 313—93 |

OTHER REFERENCES

MDDC–388, A Manual on the Measurement of Radioactivity, by Jaffey et al., Atomic Energy publication, declassified October 15, 1946. Copies may be obtained from Technical Information Branch, Oak Ridge, Tenn., AEC, Oak Ridge, Tenn., Mar. 2, 1949.

RALPH G. NILSON, *Primary Examiner.*

WALTER STOLWEIN, *Examiner.*